United States Patent
Heindl et al.

(10) Patent No.: US 11,409,272 B2
(45) Date of Patent: Aug. 9, 2022

(54) METHOD FOR CHECKING AN INDUSTRIAL FACILITY, COMPUTER PROGRAM, COMPUTER-READABLE MEDIUM AND SYSTEM

(71) Applicant: Siemens Aktiengesellschaft, Munich (DE)

(72) Inventors: Elisabeth Heindl, Cadolzburg (DE); Neidig Joerg, Nuremberg (DE); Thomas Trenner, Fuerth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 165 days.

(21) Appl. No.: 16/788,013

(22) Filed: Feb. 11, 2020

(65) Prior Publication Data
US 2020/0257280 A1    Aug. 13, 2020

(30) Foreign Application Priority Data
Feb. 12, 2019   (EP) ..................... 19156634

(51) Int. Cl.
*G05B 23/02* (2006.01)
*G05B 19/05* (2006.01)

(52) U.S. Cl.
CPC ..... *G05B 23/0243* (2013.01); *G05B 23/0283* (2013.01); *G05B 19/05* (2013.01); *G05B 2219/13186* (2013.01)

(58) Field of Classification Search
None
See application file for complete search history.

(56) References Cited

U.S. PATENT DOCUMENTS

| | | | | |
|---|---|---|---|---|
| 5,046,022 A * | 9/1991 | Conway | ............... | G05B 19/427 700/250 |
| 6,205,567 B1 * | 3/2001 | Maruyama | ........... | G06F 11/261 703/13 |
| 6,289,296 B1 * | 9/2001 | Umeno | ................... | G06F 17/18 708/250 |
| 6,295,510 B1 * | 9/2001 | Discenzo | ................. | H02P 9/02 702/183 |
| 9,134,726 B2 | 9/2015 | Colombo et al. | | |

(Continued)

FOREIGN PATENT DOCUMENTS

WO     2018162048     9/2018

OTHER PUBLICATIONS

SIMMIT Unit, Siemens AG, pp. 1-2, 2019.

(Continued)

*Primary Examiner* — Mohammad Ali
*Assistant Examiner* — David Earl Ogg
(74) *Attorney, Agent, or Firm* — Cozen O'Connor

(57) ABSTRACT

A computer program, a computer-readable medium and to a system and method for checking an industrial facility formed as an automation facility, wherein real components of a provided real facility and/or data stemming from the real facility and/or simulated components of a provided simulated facility and/or data stemming simulated facility are manipulated using a computer program that includes at least one random algorithm, in particular during ongoing operation, such that random-based fault situations are caused in the real facility and/or the simulated facility.

24 Claims, 3 Drawing Sheets

(56) References Cited

U.S. PATENT DOCUMENTS

| | | | |
|---|---|---|---|
| 2007/0162894 A1 | 7/2007 | Noller et al. | |
| 2007/0198959 A1* | 8/2007 | Schubert | G06F 30/33 |
| | | | 716/106 |
| 2008/0192812 A1* | 8/2008 | Naeve | G01D 21/00 |
| | | | 375/222 |
| 2009/0089027 A1 | 4/2009 | Sturrock et al. | |
| 2010/0241251 A1* | 9/2010 | Kuhn | G05B 23/0245 |
| | | | 700/31 |
| 2011/0087357 A1* | 4/2011 | Lorenz | G06F 30/20 |
| | | | 700/104 |
| 2011/0288846 A1 | 11/2011 | Kihas | |
| 2012/0215352 A1* | 8/2012 | Eberst | G05B 19/4083 |
| | | | 700/253 |
| 2012/0317058 A1* | 12/2012 | Abhulimen | G06N 3/0427 |
| | | | 706/2 |
| 2016/0124825 A1* | 5/2016 | Kunimitsu | G06F 11/076 |
| | | | 714/33 |
| 2018/0017467 A1* | 1/2018 | Hiruta | G05B 17/02 |
| 2020/0183370 A1* | 6/2020 | Pelella | G05B 17/02 |

OTHER PUBLICATIONS

SIMMIT Simulation Platform, Siemens AG, pp. 1-2, 2019.
Chaos-Monkey, p. 1-2, Aug. 1, 2017.
"Your Gateway to automation in the Digital Enterprise", Siemens AG, 2018.

* cited by examiner

METHOD FOR CHECKING AN INDUSTRIAL FACILITY, COMPUTER PROGRAM, COMPUTER-READABLE MEDIUM AND SYSTEM

BACKGROUND OF THE INVENTION

1. Field of the Invention

The invention relates to a method for checking an industrial facility, in particular an automation facility, a computer program, a computer-readable medium and to a system.

2. Description of the Related Art

An automation facility consists of a large number of different individual components whose interaction then allows the automation objective to be achieved. The individual components may be both hardware components and software components and also combined hardware and software components.

In particular, when a facility is commissioned, checking for faults constitutes an essential aspect in order to meet the necessary safety requirements. Precisely by virtue of the interaction between the multiplicity of individual components, however, dependencies may arise, and thus also additional causes for faulty behavior that could not be taken into consideration in any way when testing the individual components. Comprehensively checking the possible dependencies in the case of a high number of individual components is, as far as the Applicant is aware, at present not possible or is possible only with a great deal of effort.

Another problem is that, at present, only those test scenarios considered during engineering are generally executed. This means in particular that possible faults in the overall system that lie outside the conceptual capabilities of the individual engineers often remain undetected. It is also the case that many previously considered and programmed-out responses to fault situations are not tested out at all during commissioning and testing due to time and effort reasons. As a result, the actual behavior of the system and whether the criteria that were adopted were sufficient is often only discovered in a real fault case during operation.

Simulation tools via which industrial facilities and their behavior can be simulated are known. In the context of such tools, it is possible to switch off or to manipulate individual components and to observe the effects, this at present being performed only deliberately and manually as far as the Applicant is aware. Purely by way of example for a simulation tool or a simulation platform for industrial technical facilities, mention is made of SIMIT from the company Siemens.

The "Chaos Monkey" tool from Netflix is also known, via which instances of a software service are regularly deactivated at random to test a redundant server architecture and to verify that a server failure does not entail any noticeable influence for clients.

SUMMARY OF THE INVENTION

Based on the prior art, it is an object of the present invention to provide a method for checking an industrial facility, in particular an automation facility, which allows particularly high reliability and at the same time particularly comprehensive checking, including of complex facilities.

This and other objects and advantages are achieved accordance with the invention by a method via which real components of a provided real facility and/or data stemming therefrom and/or simulated components of a provided simulated facility and/or data stemming therefrom are manipulated using a computer program comprising at least one random algorithm, in particular during ongoing operation, such that random-based fault situations are caused in the real and/or the simulated facility.

The Applicant has established that, using a random-based, tool-assisted chaos method, a particularly comprehensive, reliable check of even complex industrial facilities is made possible with comparatively little effort, both during a simulation phase and during commissioning in particular of a real, physical facility.

Random-based components of a facility and/or data stemming therefrom are manipulated in accordance with the invention. Consequently, resultant fault scenarios are not restricted to scenarios selected in a targeted manner or conceived by an operator or engineer, as in the prior art, but rather virtually any scenarios may be caused and thus covered. It thus becomes possible for the first time to also find faults or causes of failure in an industrial facility that were unconsidered or unable to be considered during engineering and/or that result from the complexity of the facility. This constitutes a considerable advantage over the prior art.

It is also an object of the invention to provide a computer program, which is also referred to as hereinafter as chaos software tools and that particularly forms or constitutes a runtime tool, is preferably that of arbitrarily or randomly boycotting the (real and/or simulated) facility or parts/components/data thereof. Fault scenarios selected thereby, in particular previously defined fault scenarios, should preferably be implemented in accordance with the respective random principle. The chaos software tool is accordingly established for this purpose. It is in particular a computer program or else a computer program compilation containing corresponding program code means.

The method in accordance with the invention may be performed both in order to check a physically existing facility and for a facility simulation, such as a digital twin. It should be understood a combination is also possible in that, for instance, both an actually existing facility (or at least parts thereof) and a simulation (or parts thereof) that is possibly created so as to accompany operation are randomly "boycotted" in the manner in accordance with the invention. In the event that both a real and a simulated facility are provided, components of both facilities and/or associated data may be manipulated in the manner in accordance with the invention.

The method in accordance with the invention also offers a significant advantage when decommissioning a facility. Specifically, by way thereof, the stability and safety of a facility is able to be demonstrated by causing random-based fault scenarios and observing that these do not lead to an unsafe state.

A component being manipulated should in particular also be understood to mean that this is put from a switched-on state into a switched-off state. Deactivating a component also thus constitutes manipulation thereof.

In a preferred embodiment of the method in accordance with the invention, the effects of the manipulation on the real and/or the simulated facility, in particular the operation thereof, are recorded or observed, and the real and/or the simulated facility and/or the controller thereof is adjusted as required, in particular detected faults are rectified.

A facility may be observed during and/or after the "boycott" in accordance with the invention and faults or "teething problems" that occur in the process may be dealt with, if necessary. It becomes possible for faults resulting from the random principle in accordance with the invention to be eradicated in particular even before production begins, this having a clearly positive effect on the fault tolerance, stability and maintenance of a facility during operation.

The response of the facility to be checked to the faults or fault scenarios generated in accordance with the random principle may, for example, be recorded electronically, in particular by the chaos software tool. As an alternative or in addition, it is also obviously possible for the facility response to be observed by a person.

In a further preferred embodiment of the method in accordance with the invention, a policy for describing components, is taken into consideration or can be taken into consideration for the check, of the facility together with specifications regarding the behavior of the components and/or regarding the connectivity of the components and/or regarding safety aspects that are relevant to the components can be created or provided, and the random-based fault situations can be caused by the computer program using the policy. Behavior of components may describe, for example, its starting and stopping behavior and its correct and faulty behavior. The computer program may access the policy and/or apply the policy.

Industrial (automation) facilities are normally not constructed homogeneously but rather consist of a multiplicity of highly different individual components and their connections to one another. As a result, it has proven to be particularly suitable to initially create a policy to describe in particular the hardware and/or software components and their behavior.

If a policy is provided, this may furthermore advantageously comprise (i) specifications as to which fault cases may occur on the respective component, preferably classified by fault types, (ii) and/or specifications as to how fault cases are in particular able to be technically triggered and/or simulated by the computer program, and/or (iii) a set of fault algorithms containing associated parameters that represent various scenarios that preferably differ in terms of which fault types and/or components should be taken into consideration and/or how many faults are allowed to occur at the same time and/or what the temporal behavior of the facility and/or of a control program thereof is and/or how long a fault situation should last and/or how quickly the next fault situation should be caused following a previous fault situation.

The fault algorithms may then in particular be selected randomly by the chaos software tool.

In particular, using the set of fault algorithms, it is possible, for example, to vary which fault types or components should be taken into consideration, how many faults are allowed to occur at the same time, what the temporal behavior is (for example, sporadic, cyclic, or continuous), how long a fault situation should or is allowed to last, or how quickly the next situation should or is allowed to be triggered after a situation is reset.

For components of an industrial automation facility and associated fault cases or states as are recorded or may be contained in a policy for a given facility, mention is made purely by way of example of:

A switch in an intra-logistics facility having the fault cases:
1) closed blocked,
2) open blocked,
3) inverted behavior,
4) time-delayed behavior,
5) shifted-cycle behavior A light barrier on a conveyor belt having the fault states:
1) always on,
2) always off,
3) flickering,
4) bouncing.

A barcode reader in a sorting facility having the fault states:
1) carrier not triggering,
2) barcode illegible,
3) barcode read incorrectly,
4) registration of expired "buffered barcodes",
5) bouncing.

It is noted that a real facility may comprise both just hardware-based and just software-based components and also components that contain a combination of (specific) hardware and software. The components of a simulated facility are usually present in the form of software or software modules that form representations or "digital effigies" of real components.

A fault algorithm may, for example, represent the case or the scenario that an existing switch is switched back and forth multiple times in a row.

A fault algorithm may also represent a random generator that, for example, switches a switch back and forth every now and then.

The chaos software tool, using at least one random algorithm, may select a fault algorithm from the policy, and thereby a fault situation or a fault state, for one or more components and implement it in real and/or simulated form in order to correspondingly "boycott" the facility. The chaos software tool may in particular select from and implement preconfigured fault situations, represented by fault algorithms, in each case preferably at any desired times and/or independently of other aspects.

In a further embodiment of the method in accordance with the invention, the facility is assigned a safety apparatus or the facility comprises such a safety apparatus. The safety apparatus is then preferably configured to allow inherently safe operation of the facility, at least with respect to some safety aspects. More preferably, the safety apparatus is activated during the check in accordance with the invention of the facility such that, when a fault situation that could lead or leads to a hazardous situation is triggered using the chaos software tool, the facility can be put into or is put into a safe state by the safety apparatus.

A technical apparatus that serves to create a failsafe state (fault-oriented system or safety apparatus) is generally constructed according to standard such that it acts independently of the normal automation unit and is inherently safe. That is, even in the case in which a fault situation that leads to a hazardous situation is triggered by the chaos software tool in accordance with the invention, a fault-oriented system can detect this and put a facility into a failsafe state. The use of the chaos software tool may be established to be particularly safe in combination with such a safety apparatus. A safety apparatus may for example be one that meets the EN 62061 standard.

In particular, in the event that it is still not desired to trigger such "unsafe" or "hazardous" scenarios, for example, because leaving a failsafe state may be cost-intensive, impermissible fault states may also be taken into consideration in the policy.

In a further embodiment, the policy comprises forbidden fault situations or is extended thereby, and the computer program initially determines a fault situation at random, compares the determined fault situation with the fault situations that are forbidden according to the policy and triggers and/or simulates the fault situation on the facility only in the event that no forbidden fault situation has been determined, otherwise a new random fault situation is determined and again compared with the fault situations that are forbidden according to the policy. This step may expediently be repeated as often as needed until a non-forbidden fault state is randomly obtained.

In a further embodiment, at least one component is stored in the policy, which component is allowed to be manipulated only under certain conditions, in particular only under expert supervision and/or only at certain times. Particularly sensitive or particularly highly safety-relevant components may also in particular be excluded from the random check. On the other hand, it is of course also possible to specify, for one or more components, that these are allowed to be manipulated under any conditions, such as at any time.

If there is provision for a policy to be used, this may be loaded onto one or even more component(s) of the facility.

With regard to the computer program, it is also the case that this may be loaded onto at least one component of the facility. This may preferably take place together with a policy.

In a further particularly preferred embodiment, an engineering tool can be accessed or is accessed to create the policy. The policy may be created, for example, by a developer, constructor and/or operator of a facility to be checked using the engineering tool. It is in particular possible to obtain or extract data or information from the engineering tool, on the basis of which a policy is then created. Purely by way of example for an engineering tool, reference is made to the so-called TIA portal created by Siemens.

In order to create or when creating the policy, it is highly advantageous for access to exist to the facility to be checked and/or (if present) a digital twin thereof. This is the case in particular because the information as to which actuators or sensors are installed in the facility can generally be read and evaluated from the program of a controller, such as a Programmable Logic Controller (PLC) program. Direct access to the facility thus offers a particularly simple option for obtaining information inter alia about the structure and behavior of the facility.

In a further embodiment of the method in accordance with the invention, two or more components of the facility are connected to one another via a communication network, in particular in the form of a bus, and data that need to be transmitted from at least one component to at least one further component via the communication network are manipulated by the computer program before they are transferred to the communication network. It is then preferably the case that the manipulation occurs immediately before the data are transferred to the communication network, immediately in particular being understood to mean that the manipulation occurs as the last step before "dispatching to the communication network".

If at least one component of the facility is in particular a programmable logic controller, data to be transmitted thereby, in particular control data, may be manipulated, for example, at a cycle control point.

In a further embodiment, the computer program manipulates data into or out of a facility, in particular IO data according to the policy, in order to apply the policy to a facility to be checked. The data are preferably manipulated in order to obtain random-based fault situations such that, in particular, all of the computer programs of a facility that access IO data (for example, control program(s)/HMI script(s), etc.) (are able to) remain unchanged. Various approaches are in principle possible in this regard.

A pure software solution is achieved, for example, when the chaos software tool is loaded onto one or more pre-existing devices with access to an existing communication network, such as peripheral device(s) and/or preferably programmable logic controller(s), preferably together with a policy to be applied.

A software-based and hardware-based solution is also conceivable. By way of example, a system preferably developed specifically for this purpose, which may comprise a PC, in particular an industrial PC, or be formed by one of these, may be connected to a communication network of a facility to be checked, where the chaos software tool is then in particular already present on the system and only the policy then has to be or is loaded onto it.

Depending on which of the embodiments is implemented, the data, in particular IO data, according to the policy may, for example, be manipulated as follows.

On an in particular programmable logic controller at the cycle control point as the last step before being dispatched onto the bus.

On a peripheral device, such as before the writing of an actuator and after the reading of a sensor to/from the respective IO assembly.

In the case of a software and hardware solution, the traffic of the communication network (for instance, bus) is preferably tapped per se, and the corresponding data, in particular IO data, are manipulated on a protocol level. For this purpose, the network topology is expediently tailored or selected such that any IO communication occurs only using a system on which the chaos diagnostic tool is then preferably present or installed, in particular passes through the system, such that access exists to all relevant data.

A system in accordance with the invention may be used for this purpose, this being described in more detail further below.

Independently of how the manipulation occurs, where manipulation particularly preferably occurs in a manner transparent to all of the participants of the communication network/bus of a facility, i.e., these can be used in unchanged form.

It is furthermore possible, in addition to the random-based check in accordance with the invention, also additionally to incorporate standardized tests as are already performed in accordance with the prior art, in particular in the development of facilities. Purely by way of example for standard tests, mention is made of "unit tests".

The information in particular compiled to form a policy may be used by the computer program. The computer program may, for example, run on an edge device connected to the facility to be checked and/or a digital twin thereof, and/or be part of a facility simulation.

In a further embodiment, the computer program outputs an instruction to a user that comprises a manipulation operation to be executed manually by the user. This constitutes one possibility for creating fault scenarios that are unable to be triggered or caused (purely) electronically. As an example of an instruction or a "manipulation proposal" for a person, mention is made of a workpiece that has, for instance, already passed through a station, is taken from the belt and is put down at another location.

In another alternative embodiment, the computer program, as an alternative or in addition to a real facility, manipulates a simulated facility and creates at least one fault situation that could not be triggered electronically in a real facility corresponding to the simulation. As an example of such a fault situation, mention is made of a workpiece falling from a belt or becoming wedged. This cannot be achieved, or cannot easily be achieved, for instance, through pure software commands or data manipulation or manipulations of a voltage supply. In particular, in order to also be able to cover and take into consideration such scenarios, it may be highly advantageous to provide a simulated facility or a digital twin of a facility.

It is a further object of the invention to provide a computer program that comprises program code means for performing the steps of the in accordance with to the invention.

The computer program in accordance with the invention may comprise a plurality of modules, for example, a tool or a module for creating a policy, in particular an engineering tool, and a runtime tool or a runtime module that is preferably configured so as to manipulate real components of a provided real facility and/or data stemming therefrom and/or simulated components of a provided simulated facility and/or data stemming therefrom using at least one random algorithm, in particular during ongoing operation, such that random-based fault situations are caused in the real and/or the simulated facility. The runtime tool may in particular be the chaos software tool.

It is noted that the chaos software tool, as an alternative thereto, represents just one module, i.e., just part of one exemplary embodiment of a computer program in accordance with the invention, and may also form the same.

It is also an object of the invention to provide a non-transitory computer-readable medium that comprises instructions that, when executed on at least one computer, prompt the at least one computer to perform the steps of the method in accordance with the disclosed embodiments of the invention.

The non-transitory computer-readable medium may be, for example, a CD-ROM or a DVD or a USB or a flash memory. It is noted that a non-transitory computer-readable medium should not just be understood to mean a physical medium, but rather such a non-transitory computer-readable medium may also be present, for example, in the form of a data stream and/or of a signal that represents a data stream.

It is also an object of invention to provide a system for performing the method in accordance with the disclosed embodiments of the invention, comprising at least one connection, in particular for connection to a communication network, at least one processor and at least one memory on which a computer program in accordance with the invention is stored/recorded.

A system in accordance with the invention preferably has at least one network port for connection to a communication network of an industrial facility, such as a bus system. The system is furthermore preferably configured such that it can "tap" fast data traffic carried, for example, via PROFINET and/or can communicate with an engineering tool, preferably an engineering tool that is used or has been used to plan the facility (facilities) to be checked. The system accordingly preferably has at least one interface for connection to such a tool.

The system in accordance with the invention may also be formed as an "edge device". An edge device is distinguished in particular in that it has cloud access, i.e., preferably at least one interface for connection to a cloud. A digital twin of a facility may, for example, be present in a cloud. The digital twin may then also be manipulated using a computer program in accordance with the invention, in particular present on the edge device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will become clear from the following description of exemplary embodiments according to the invention with reference to the appended drawing, in which, in each case purely schematically.

DETAILED DESCRIPTION OF THE EXEMPLARY EMBODIMENTS

Figure 1:
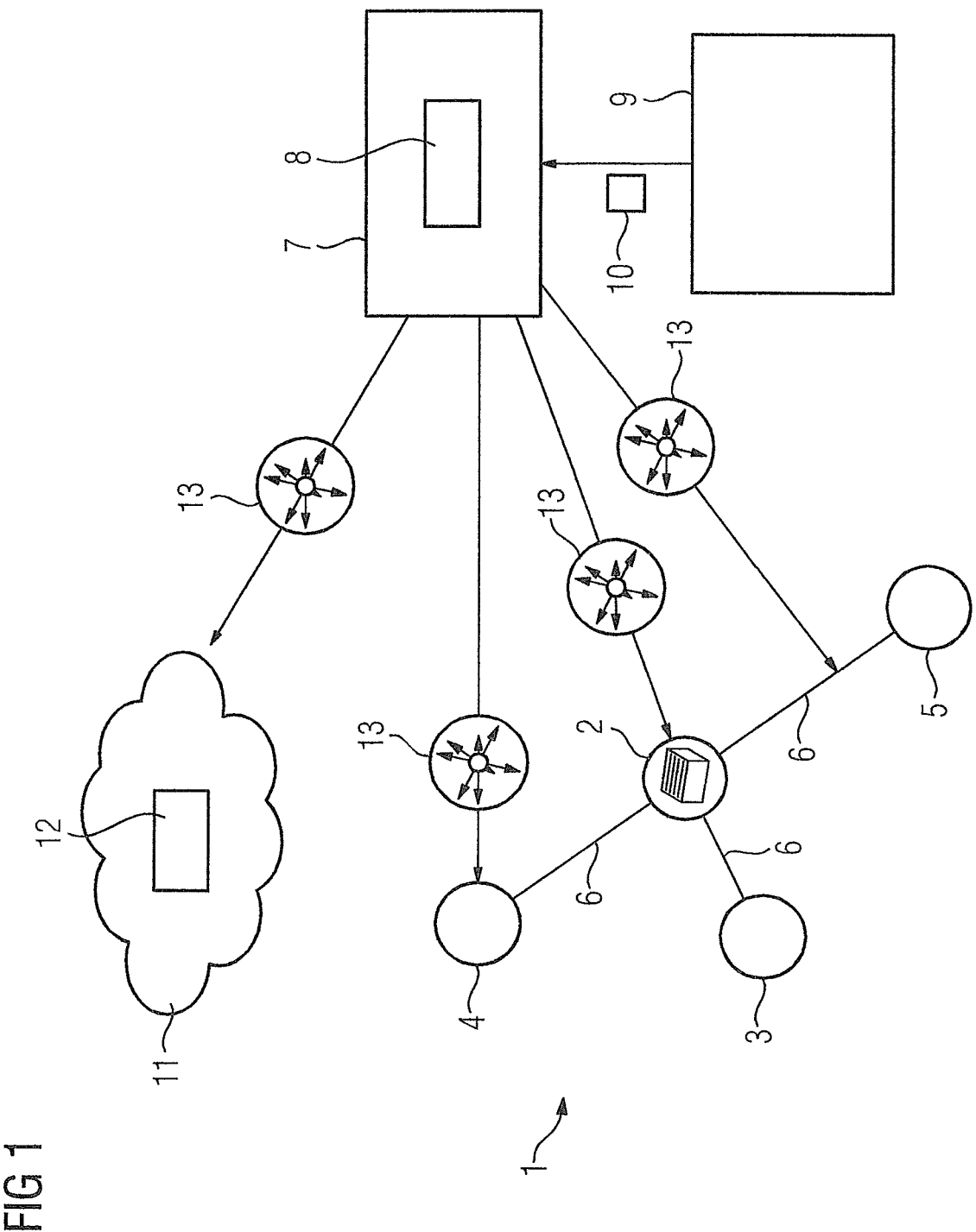
FIG. 1 shows an industrial automation facility that is checked according to an exemplary embodiment of the method in accordance with the invention.

FIG. 1 shows a purely schematic partial illustration of an industrial, technical automation facility in which goods or items, not illustrated in more detail in the figure, are produced or further processed automatically.

FIG. 1 shows, by way of example, a few components of the automation facility 1, specifically a bus 2, a production line stage 3, an assembly module 4 and a transport module 5. The production line stage 3, the assembly module 4 and the transport module 5 each comprise actuators and sensors and a dedicated controller. The production line stage 3, the assembly module 4 and the transport module 5 are each connected to the bus 2. Each bus connection 6 is indicated schematically by a line. Data can be transferred between connected participants in a manner known per se via the bus 2.

Also shown is an edge device 7, which represents one exemplary embodiment of a system in accordance with the invention. This comprises a processor, a memory and an interface for connection to a communication network, specifically the bus 2 of the facility 1, via which the components thereof can exchange data. In the present case, the edge device 7 is formed as an industrial PC. A chaos software tool 8 is stored on the edge device 7. In the exemplary embodiment described here, the chaos software tool 8 forms one of two modules of one exemplary embodiment of a computer program in accordance with the invention.

The second module is formed by an engineering tool 9 in which a policy 10 can be created by a user, not illustrated in the figures, in order to describe the facility 1 and a digital twin 12 thereof present in a cloud 11. The engineering tool 9 is in the present case the TIA portal originating from Siemens, this being intended to be understood as merely an example, and other engineering tools may in principle also be used.

The engineering tool 9 is connected to the edge device 7 such that a policy 10, after it has been created by a user, can be transferred to the edge device 7. A corresponding interface is present in the case of the edge device 7 and the engineering tool 9.

The edge device 7 also has access to the cloud 11 in which the digital twin 12 of the automation facility 1 is present.

Elements in FIG. 1 that are provided with the reference numeral 13 indicate that fault situations 13 can be triggered or are triggered both in the real automation facility 1 and in the digital twin 12 in the cloud 11 via the edge device 7, specifically using the chaos software tool 8 stored thereon.

An exemplary embodiment of the method in accordance with the invention is performed to check the automation facility 1 and the digital twin 12. Here, real components 2, 3, 4, 5, 6 of the provided real facility 1 and data stemming therefrom and simulated components of the provided simulated facility 12 and data stemming therefrom are manipulated using the chaos software tool 8, which for this purpose comprises at least one random algorithm, during ongoing operation of the facility 1 and of the twin 12, such that random-based fault situations are caused in the real facility 1 and the simulated facility 12.

It should be noted that a real facility 1 may comprise both just hardware-based and just software-based components and also components that contain a combination of (specific) hardware and software. All of these types of component may be or are checked at random. The components of a simulated facility are usually present in the form of software or software modules that form representations or "digital effigies" of real components. All of these types of component may be randomly "boycotted" in the context of the method in accordance with the invention. It should furthermore be noted that further components of the facility 1 may of course be manipulated in addition to the components 2, 3, 4, 5, 6 shown purely by way of example in FIG. 1.

Random faults are in this case caused in accordance with the invention using the policy 10, which accordingly needs to be created beforehand in a first step.

Industrial automation facilities 1 are normally not constructed homogeneously but rather consist of a multiplicity of highly different individual components 2, 3, 5, 5, 6 and their connection to one another. Consequently, as in the example illustrated in FIG. 1, the policy 10 is created in order to describe the hardware and software components 2, 3, 4, 5, 6 both of the real automation facility 1 and of the digital twin 12 and the behavior thereof.

The policy 11 here in the present case describes components 2, 3, 4, 5, 6 of the facility 1 and of the twin 12 together with specifications regarding the behavior of the respective component, regarding the connectivity thereof and regarding safety aspects that are relevant to the respective component 2, 3, 4, 5, 6. Component behavior in the context of the exemplary embodiment described here describes the starting and stopping behavior and the correct and faulty behavior.

The policy 10 furthermore comprises specifications as to which fault cases may occur on the respective component 2, 3, 4, 5, 6, where the fault cases are classified by fault type, and specifications as to how fault cases may be technically triggered and/or simulated by the chaos software tool 8.

The policy 10 furthermore comprises a set of fault algorithms and associated parameters that represent various scenarios that differ in terms of which fault types and components 2, 3, 4, 5, 6 should be taken into consideration, how many faults are allowed to occur at the same time, what the temporal behavior is, how long a fault situation should last and how quickly the next fault situation should or is allowed to be caused following a previous fault situation. Using the set of fault algorithms, it is accordingly possible to vary which fault types or components should be taken into consideration, how many faults are allowed to occur at the same time, what the temporal behavior is (for example, sporadic, cyclic, or continuous), how long a fault situation should last and how quickly the next one should be triggered after a situation is reset.

Here, the policy 10 comprises inter alia the fact that a light barrier, not shown in more detail in FIG. 1, is present on a conveyor belt of the transport module 5 of the facility 1 and is distinguished by the fault states
1) always on,
2) always off,
3) flickering,
4) bouncing.

Also listed is a barcode reader in a sorting facility, in the present case of the assembly module 4, which is distinguished by the following fault states
1) carrier not triggering,
2) barcode illegible,
3) barcode read incorrectly,
4) registration of expired "buffered barcodes",
5) bouncing.

The policy 10 in the present case also comprises the specification of forbidden fault situations.

This is the case because the facility 1, specifically a programmable logic controller thereof, comprises a safety apparatus.

Figure 2:
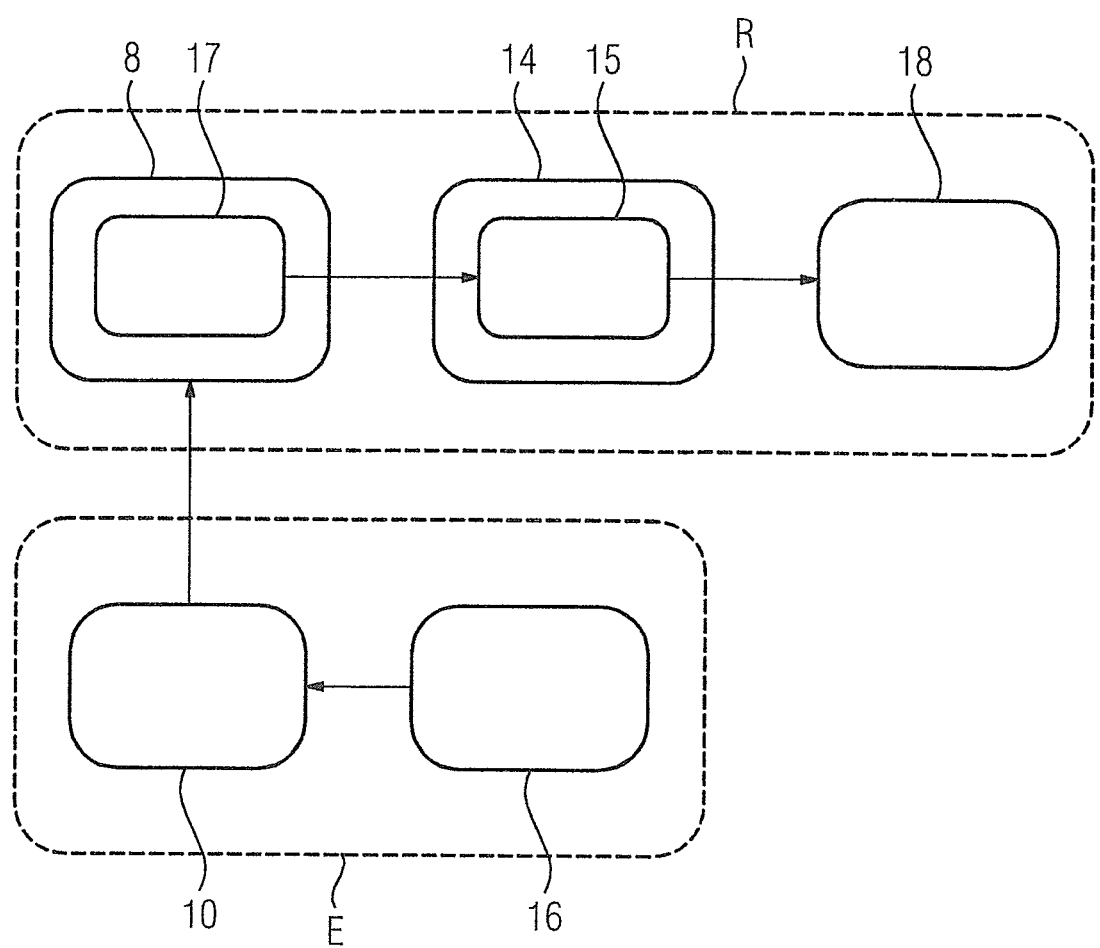
FIG. 2 shows a controller of the facility from FIG. 1 that is connected to sensors/actuators and via which a fault situation is randomly triggered using a chaos software tool.

The programmable logic controller 14 having the safety apparatus 15 is not able to be seen in FIG. 1, but is illustrated in FIG. 2—in each case only purely schematically as a block element. It should be noted that in FIG. 2 the process is illustrated at runtime R, i.e., the process during ongoing operation of the facility 1, 12, and the engineering E performed earlier, specifically the creation of the policy 10, is shown at the bottom, these being delimited from one another graphically by borders having a dashed line.

The safety apparatus 15, which may also be referred to as fault system or F-system for short, is configured so as to allow inherently safe operation of the facility 1 at least in terms of some safety aspects. Specifically, the safety apparatus 15 serves to create a failsafe state (fault-oriented system) and is constructed according to standard, in the present case the EN 62061 standard, such that it acts independently of the normal controller 14 and is inherently safe. The safety apparatus 15 in particular ensures that the facility 1 is put into a safe state in the event that certain impermissible states are attained or certain parameters are exceeded.

The safety apparatus 15 is activated during the check in accordance with the invention of the facility 1 such that, when a fault situation that could lead or leads to a hazardous situation is triggered using the chaos software tool 8, the facility 1 is automatically put into a safe state.

Here, however, it is not desired to trigger such "unsafe" or "hazardous" scenarios because leaving a failsafe state is time-intensive and cost-intensive. In order to avoid this happening, impermissible fault states are taken into consideration in the policy 11.

Specifically, when the policy was created, a safety plan 16 of the facility 1 that meets the requirements of the EN 62061 standard was taken into consideration. This is (again only schematically) indicated in FIG. 2, in which an arrow points from the safety plan 16 to the policy 10.

If necessary, the policy 10 may also store the fact, for one or more components 2, 3, 4, 5, 6, that these are allowed to be manipulated only under certain conditions, such as only under expert supervision and/or only at particular times.

Particularly sensitive or particularly highly safety-relevant components 2, 3, 4, 5, 6 may also be excluded per se from the random check. On the other hand, it is of course also possible to specify, for one or more components 2, 3, 4, 5, 6, that these are allowed to be manipulated under any conditions, such as at any time and/or without supervision.

It is noted that it is highly advantageous for the creation of the policy 10 if direct access exists to the facility 1 to be checked and possibly the digital twin 12, as in the present case via the TIA portal 9. This is the case in particular because the information as to which actuators or sensors are installed in the facility 1 generally can be read and evaluated from the program of the controller 14, the PLC program. Direct access to the facility 1 thus offers a particularly simple option for obtaining information inter alia about the structure and behavior of the facility 1, as is required for the policy 10.

Following the creation of the policy 11 and the transfer thereof to the edge device 7, the random-based "boycott" of the facility (facilities) 1, 13 in accordance with the invention may be performed by the chaos software tool 8. Here, a fault algorithm that represents a fault situation is selected by the chaos software tool 8, specifically resorting to or using at least one random algorithm from the policy 11 contained therein.

If a fault situation has been determined randomly by the chaos software tool 8 (that is, a fault algorithm has been selected), this is initially compared with the fault situations that are forbidden according to the policy 10. For this purpose, the chaos software tool 8 comprises a safety component 17 (see FIG. 2). The fault situation is triggered and/or simulated on the facility 1 and/or the facility 12 only in the event that no forbidden fault situation has been determined, otherwise a new random fault situation is determined and again compared with the fault situations that are forbidden according to policy 10. This is possibly frequently repeated until a non-forbidden fault state is randomly obtained.

If a non-forbidden fault algorithm is present, this is executed in order to trigger and/or to implement the corresponding fault situation or the corresponding fault. Merely by way of example, reference is made to data being sent on the bus 2, where the data indicates or simulates multiple opening and closing of a barrier.

Both components 2, 3, 4, 5, 6, 14 of the real facility 1 and of the digital twin 12 and data thereof are manipulated. It should be noted that manipulating a component should in particular also be understood to mean the (random) switching off thereof. Here, data that are transmitted from the controller 14 of the facility 1 to actuators and data that are received from sensors are manipulated. It should be noted that the actuators and sensors of the facility 1 in FIG. 1 are unable to be seen, but are illustrated purely schematically in FIG. 2 by way of a block element provided with the reference sign 18. Likewise this is marked in FIG. 2.

In this case, the data traffic in the communication network of the facility 1, i.e., the bus traffic, is tapped by the edge device 7, and a random-based manipulation of data (also) takes place on a protocol level.

It should be noted that, as an alternative or in addition to the edge device 7 tapping the data and manipulating them on a protocol level, manipulation of the data is also possible on the PLC 14, in particular at the cycle control point, and/or on peripheral/IO devices, in particular before the writing of an actuator and/or after the reading of a sensor. For this purpose, there is in particular then provision for the chaos software tool 8 to be stored on the PLC 14 and/or the relevant peripheral/IO devices, expediently together with the policy 10. The data are preferably case manipulated as the last step before being "dispatched on the bus". An additional edge device 7 may also then be dispensed with.

The data are in this case manipulated in a manner transparent to all of the network/bus participants.

The chaos software tool 8 may also cause confusion by manipulating the data, in particular in the simulated facility 12. An extract from a purely exemplary policy 11 for a cloud service is reproduced below:

```
"CloudService":{
    "Portal":{
        "PortalUrl":"https:/portal.azure.com/",
        "LoginCredentials":{
            "Name":"           user@siemens.com",
            "Password": "xxxxxxx"
        }
    }
    "Service":{
        "ServiceUrl":"/subscriptions/266366e9-9c90-4d9e-8fb2-
e7ed79f65597/resourcegroups/GatewayEval/providers/Microsoft.
Devices/IotHubs/Sp141IOTHub"
        "AccesKey":"0WHB3/2EzTHeXg/3jrlDvNn2iE1PkgRrcEL48/q2JKo="
        "Skill":"UploadEngineeringData"
        "Stop":<Azure stop command>
        "Start":<Azure start command>
        "Downtime":10 000
        "ManupalationService": <Url for backend service
        }
}
```

The extract contains the access data for the cloud portal and for the service itself, and the manipulation options, i.e., stopping the service, restarting or another backend service that serves for manipulation purposes.

It may also be the case that the chaos software tool 8 outputs one or more instructions to a user comprising a manipulation operation to be executed manually by the user. This constitutes one possibility for creating fault scenarios that are not able to be triggered or caused (purely) electronically. As an example of an instruction or a "manipulation proposal" for a person, mention is made of a workpiece that has, for instance, already passed through a station, is taken from the belt by the person and is put down at another location. Corresponding instructions may be output to a user on a display apparatus, for instance, in the form of a screen.

There may also be provision for the chaos software tool 8 to create at least one fault situation in the simulated facility 12 that unable to be triggered electronically in the real facility 1. An example of such a fault situation is a workpiece falling from a belt or becoming wedged. This cannot be achieved, or cannot easily be achieved, for instance, through pure software commands or data manipulation or manipulations of a voltage supply. In particular, in order to also be able to cover and take into consideration such scenarios, it may be highly advantageous to provide a facility simulation 12 in addition to a real facility 1, as is the case here.

The effect of the fault situation respectively triggered by the chaos software tool 8 using the policy 10 on the operation of the real facility 1 and/or the simulated facility 12 is observed by a person and/or recorded electronically, in particular by the chaos software tool 8. The real facility 1 and/or the simulated facility 12 and/or the control (program) thereof may be adjusted as required. It is in particular possible in this case to rectify detected faults or problems, such as in the structure and/or the control software and/or the connection of components.

Using the random-based, tool-assisted chaos method, a particularly comprehensive, reliable check of even complex industrial facilities 1 is made possible with comparatively little effort, both during a simulation phase and during commissioning. Since components 2, 3, 4, 5, 6, 14 of a facility 1 and/or data stemming therefrom are manipulated at random in accordance with the invention, resultant fault scenarios are not restricted to scenarios selected in a targeted manner or conceived by an operator or engineer, as in the prior art, but rather virtually any scenarios may be caused and thus covered. It thus becomes possible for the first time also to find faults or causes of failure in an industrial facility 1 that were not considered or were not able to be considered during engineering and/or that result from the complexity of the facility 1. This constitutes a considerable advantage over the prior art.

Figure 3:
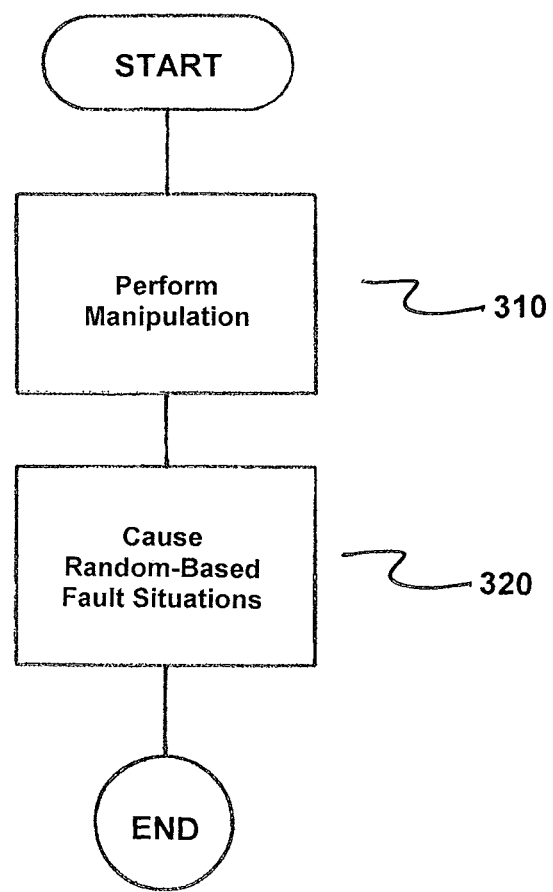
FIG. 3 is a flowchart of the method in accordance with the invention.

FIG. 3 is a flowchart of the method for checking an industrial facility 1, 12. The method comprises manipulating at least one of (i) real components 2, 3, 4, 5, 6, 14 of a provided real facility 1, (ii) data stemming from the real facility 1, (iii) simulated components of a provided simulated facility 12 and (iv) data stemming from the simulated facility 12 using a computer program 8 comprising at least one random algorithm during ongoing operation, as indicated in step 310.

Next, random-based fault situations are caused in either (i) the real facility 1 and/or (ii) the simulated facility 12 based on the manipulation, as indicated in step 320.

Although the invention has been more specifically illustrated and described in detail by means of the preferred exemplary embodiment, the invention is not restricted by the examples disclosed and other variations may be derived herefrom by a person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for checking an industrial facility, the method comprising:
   manipulating at least one of (i) real components of a provided real facility, (ii) data stemming from the real facility, (iii) simulated components of a provided simulated facility and (iv) data stemming from the simulated facility using a computer program comprising at least one random algorithm during ongoing operation; and
   causing random-based fault situations via a chaos software tool in at least one of (i) the real facility based on said manipulation to perform a reliability check of the industrial facility during commissioning of the real facility and (ii) the simulated facility based on said manipulation to perform the reliability check of the industrial facility during simulation and during commissioning of the real facility.

2. The method as claimed in claim 1, further comprising:
   recording an effect on operation of at least one of (i) the real facility and (ii) the simulated facility; and
   performing a required adjustment of at least one of (i) the real facility, (ii) the simulated facility and (iii) a controller of one of the real facility and the simulated facility such that at least one of detected problems and faults are rectified.

3. The method as claimed in claim 1, further comprising:
   creating or providing a policy for describing components, which is taken into consideration for a check, of the real and simulated facilities together with specifications regarding a behaviour of at least one of (i) the components, (ii) a connectivity of the components and (iii) safety aspects which are relevant to the components; and
   wherein the random-based fault situations are caused by the computer program utilizing the policy.

4. The method as claimed in claim 2, further comprising:
   creating or providing a policy for describing components, which is taken into consideration for a check, of the real and simulated facilities together with specifications regarding a behaviour of at least one of (i) the components, (ii) a connectivity of the components and (iii) safety aspects which are relevant to the components; and
   wherein the random-based fault situations are caused by the computer program utilizing the policy.

5. The method as claimed in claim 3, wherein the policy further comprises at least one of:
   specifications as to which fault cases may occur on a respective component, the specifications being classified by fault types;
   specifications as to how fault cases can be at least one of technically triggered and simulated by the computer program; and
   a set of fault algorithms containing associated parameters which represent various scenarios which differ in terms of at least one of (i) which fault types should be taken into consideration, (ii) which components should be taken into consideration, (iii) how many faults are allowed to occur at the same time (iv) a temporal behaviour, (v) how long a fault situation should last and (vi) how quickly a next fault situation should be caused following a previous fault situation.

6. The method as claimed in claim 3, wherein the policy comprises forbidden fault situations or is extended thereby, and the computer program initially determines a fault situation at random, compares the determined fault situation with the fault situations that are forbidden according to the policy and at least one of (i) triggers and (ii) simulates the fault situation on the facility only in an event that no forbidden fault situation has been determined, otherwise a new random fault situation is determined and again compared with the fault situations that are forbidden according to policy.

7. The method as claimed in claim 5, wherein the policy comprises forbidden fault situations or is extended thereby, and the computer program initially determines a fault situation at random, compares the determined fault situation with the fault situations that are forbidden according to the policy and at least one of (i) triggers and (ii) simulates the fault situation on the facility only in an event that no forbidden fault situation has been determined, otherwise a new random fault situation is determined and again compared with the fault situations that are forbidden according to policy.

8. The method as claimed in claim 3, wherein at least one component is stored in the policy, said component being allowed to be manipulated only under certain conditions comprising one of (i) under expert supervision and (ii) only at certain times.

9. The method as claimed in claim 5, wherein at least one component is stored in the policy, said component being allowed to be manipulated only under certain conditions comprising one of (i) under expert supervision and (ii) only at certain times.

10. The method as claimed in claim 6, wherein at least one component is stored in the policy, said component being allowed to be manipulated only under certain conditions comprising one of (i) under expert supervision and (ii) only at certain times.

11. The method as claimed in claim 3, wherein at least one of (i) the policy and (ii) the computer program (8) are loaded onto at least one component of the industrial facility.

12. The method as claimed in claim 3, further comprising:
creating or providing an engineering tool in which the policy is creatable.

13. The method as claimed in claim 1, wherein a plurality of components of the facility are interconnected via a communication network formed as a bus; and wherein data that need to be transmitted from at least one component to at least one further component via the communication network are manipulated by the computer program before being transferred to the communication network.

14. The method as claimed in claim 13, wherein at least one component of the facility comprises a programmable logic controller; and wherein data to be transmitted to the programmable logic controller are manipulated at a control point.

15. The method as claimed in claim 3, wherein the computer program manipulates the data according to the policy comprising specifications as to how fault situations are at least one of (i) be technically triggerable and (ii) simulated.

16. The method as claimed in claim 12, wherein the computer program manipulates the data according to the policy comprising specifications as to how fault situations are at least one of (i) be technically triggerable and (ii) simulated.

17. The method as claimed in claim 13, wherein the computer program manipulates the data according to the policy comprising specifications as to how fault situations are at least one of (i) be technically triggerable and (ii) simulated.

18. The method as claimed in claim 14, wherein the computer program manipulates the data according to the policy comprising specifications as to how fault situations are at least one of (i) be technically triggerable and (ii) simulated.

19. The method as claimed in claim 1, wherein the facility one of (i) is assigned a safety apparatus and (ii) comprises the safety apparatus;
wherein the safety apparatus is configured to allow inherently safe operation of the facility, at least with respect to some safety aspects; and
wherein the safety apparatus is activated during the check of the facility such that, when a fault situation that potentially leading to or leads to a hazardous situation is triggered utilizing the computer program, the facility is automatically put into a safe state by the safety apparatus.

20. The method as claimed in claim 1, wherein the computer program outputs an instruction to a user that comprises a manipulation operation to be executed manually by the user.

21. The method as claimed in claim 1, wherein the computer program, as an alternative or in addition to a real facility, manipulates a simulated facility and creates at least one fault situation that would unable to be triggered electronically in a real facility corresponding to the simulation.

22. The method as claimed in claim 1, wherein the industrial facility comprises an automation facility.

23. A non-transitory computer-readable medium that comprises program instructions which, when executed on at least one computer, prompts the at least one computer to checking an industrial facility, the program instructions comprising:
program code for manipulating at least one of (i) real components of a provided real facility, (ii) data stemming from the real facility, (iii) simulated components of a provided simulated facility and (iv) data stemming from the simulated facility using a computer program comprising at least one random algorithm during ongoing operation; and
program code for causing random-based fault situations via a chaos software tool in at least one of (i) the real facility based on said manipulation to perform a reliability check of the industrial facility during commissioning of the real facility and (ii) the simulated facility based on said manipulation to perform the reliability check of the industrial facility during simulation and during commissioning of the real facility.

24. A system comprising:
at least one connection for connection to a communication network,
at least one processor; and
at least one memory on which a computer program is stored;
wherein the system is configured to:
manipulate at least one of (i) real components of a provided real facility, (ii) data stemming from the real facility, (iii) simulated components of a provided simulated facility and (iv) data stemming from the simulated facility using a computer program comprising at least one random algorithm during ongoing operation; and
cause random-based fault situations via a chaos software tool in at least one of (i) the real facility based on said manipulation to perform a reliability check of the industrial facility during commissioning of the real facility and (ii) the simulated facility based on said manipulation to perform the reliability check of the industrial facility during simulation and during commissioning of the real facility.

* * * * *